US012180920B2

(12) United States Patent
Anthony et al.

(10) Patent No.: US 12,180,920 B2
(45) Date of Patent: Dec. 31, 2024

(54) BI STAGE WAVE ENERGY CONVERTER

(71) Applicants: John Kiran Anthony, Karnataka (IN); Immanuvel Lohith, Karnataka (IN); Reshma Rao, Karnataka (IN)

(72) Inventors: John Kiran Anthony, Karnataka (IN); Immanuvel Lohith, Karnataka (IN); Reshma Rao, Karnataka (IN)

( * ) Notice: Subject to any disclaimer, the term of this patent is extended or adjusted under 35 U.S.C. 154(b) by 0 days.

(21) Appl. No.: 18/031,657

(22) PCT Filed: Dec. 22, 2021

(86) PCT No.: PCT/IN2021/051200
§ 371 (c)(1),
(2) Date: Apr. 13, 2023

(87) PCT Pub. No.: WO2022/153327
PCT Pub. Date: Jul. 21, 2022

(65) Prior Publication Data
US 2023/0383719 A1   Nov. 30, 2023

(30) Foreign Application Priority Data

Jan. 15, 2021   (IN) .............................. 202141001972

(51) Int. Cl.
*F03B 13/00*   (2006.01)
*F03B 13/18*   (2006.01)

(52) U.S. Cl.
CPC .................................... *F03B 13/18* (2013.01)

(58) Field of Classification Search
CPC ........ F03B 13/18; F03B 13/188; F03B 13/24; F03B 13/185; F03B 13/182;
(Continued)

(56) References Cited

U.S. PATENT DOCUMENTS

| 4,258,270 A | * | 3/1981 | Tornkvist | ............ F03B 13/1815 |
| | | | | 60/499 |
| 4,400,940 A | * | 8/1983 | Watabe | ................. F03B 13/182 |
| | | | | 417/330 |

(Continued)

FOREIGN PATENT DOCUMENTS

| EP | 2712398 B1 | 9/2018 |
| GB | 2333130 A | 7/1999 |

(Continued)

OTHER PUBLICATIONS

International Search Report for PCT/IN2021/051200 Mailed On Mar. 21, 2022.

(Continued)

*Primary Examiner* — Julio C. Gonzalez
(74) *Attorney, Agent, or Firm* — Rivka Friedman

(57) ABSTRACT

The invention provides a bi stage wave energy converter. The energy converter includes a base having a vertical surface, a first energy acquisition arrangement and a second energy acquisition arrangement coupled to the first energy acquisition arrangement. The first energy acquisition arrangement includes a first partially resilient surface, the first partially resilient surface being mounted to the vertical surface of the base and a second partially resilient surface hinge mounted to the first partially resilient surface. The first partially resilient surface and the second partially resilient surface are connected by at least one third partially resilient surface to create a space for releasably holding a predetermined volume of the water disposed of by an incoming wave. An energy conversion arrangement is coupled to the first energy acquisition arrangement and the second energy acquisition arrangement.

9 Claims, 9 Drawing Sheets

(58) Field of Classification Search
CPC .............. F03B 13/1805; F05B 2210/12; F05B 2210/18; F05B 2210/404; Y02E 10/30
See application file for complete search history.

(56) References Cited

U.S. PATENT DOCUMENTS 4,448,020 A * 5/1984 Wood .................... F03B 13/188
60/501
2008/0018113 A1 1/2008 Tal-or

FOREIGN PATENT DOCUMENTS

GB 2540615 A 1/2017
KR 101285856 B1 7/2013

OTHER PUBLICATIONS

Examination Report for Indian Application No. 202114001972 Mailed On Mar. 10, 2021.

* cited by examiner

BI STAGE WAVE ENERGY CONVERTER

FIELD OF INVENTION

The invention generally relates to the field of harvesting energy from waves and more particularly to a bi stage wave energy converter.

BACKGROUND

Waves are a very promising source of energy carrier among all renewable power sources. Waves can travel for thousands of miles until their energy is dissipated. The total energy possessed by a wave is estimated based on the wave amplitude and wave period. The movement of waves in the form of crest and trough causes heaving and surging, which can be converted into electrical energy by using a wave energy converter.

There are different systems known in the art for converting wave energy into electrical energy. One of the systems discloses a wave energy converter wherein an oscillating flap/a prime mover placed in the ocean oscillates back and forth or up and down according to the movement of the waves. The oscillating flap/the prime mover traces the same path of the waves. The oscillating flap has two liquid domains at both sides, one side of the oscillating flap facing the direction of wave movement and the other side in contact with still water. Therefore, the prime mover or oscillating flap is subjected to two conditions: one is the force acting over the flap and the other is the force exerted by the flap. The force over the flap by the wave action exerts a drag force and the flap extracts energy from the wave. This extracted energy is used to drive a generator. But the action of the force exerted by the flap re-generates the wave behind the flap, so that some amount of energy is dissolved into the water from the oscillating flap. This loss of energy from the oscillating flap will greatly reduce the overall efficiency of the wave energy collector. Hence, there is a need for a wave energy converter that prevents energy loss from the oscillating flap.

BRIEF DESCRIPTION OF DRAWINGS

So that the manner in which the recited features of the invention can be understood in detail, some of the embodiments are illustrated in the appended drawings. It is to be noted, however, that the appended drawings illustrate only typical embodiments of this invention and are therefore not to be considered limiting of its scope, for the invention may admit to other equally effective embodiments.

SUMMARY OF THE INVENTION

One aspect of the invention provides a bi stage wave energy converter. The energy converter includes a base having a vertical surface, a first energy acquisition arrangement and a second energy acquisition arrangement coupled to the first energy acquisition arrangement. The first energy acquisition arrangement includes a first partially resilient surface, the first partially resilient surface being mounted to the vertical surface of the base and a second partially resilient surface hinge mounted to the first partially resilient surface. The first partially resilient surface and the second partially resilient surface are connected by at least one third partially resilient surface to create a space for releasably holding a pre-determined volume of the water disposed of by an incoming wave. An energy conversion arrangement is coupled to the first energy acquisition arrangement and the second energy acquisition arrangement.

DETAILED DESCRIPTION OF THE INVENTION

Various embodiments of the invention provide a bi stage wave energy converter. The energy converter includes a base having a vertical surface, a first energy acquisition arrangement, a second energy acquisition arrangement coupled to the first energy acquisition arrangement and an energy conversion arrangement coupled to the first energy acquisition arrangement and the second energy acquisition arrangement. The bi stage wave energy converter described herein above in brief shall be explained in detail.

Figure 1:
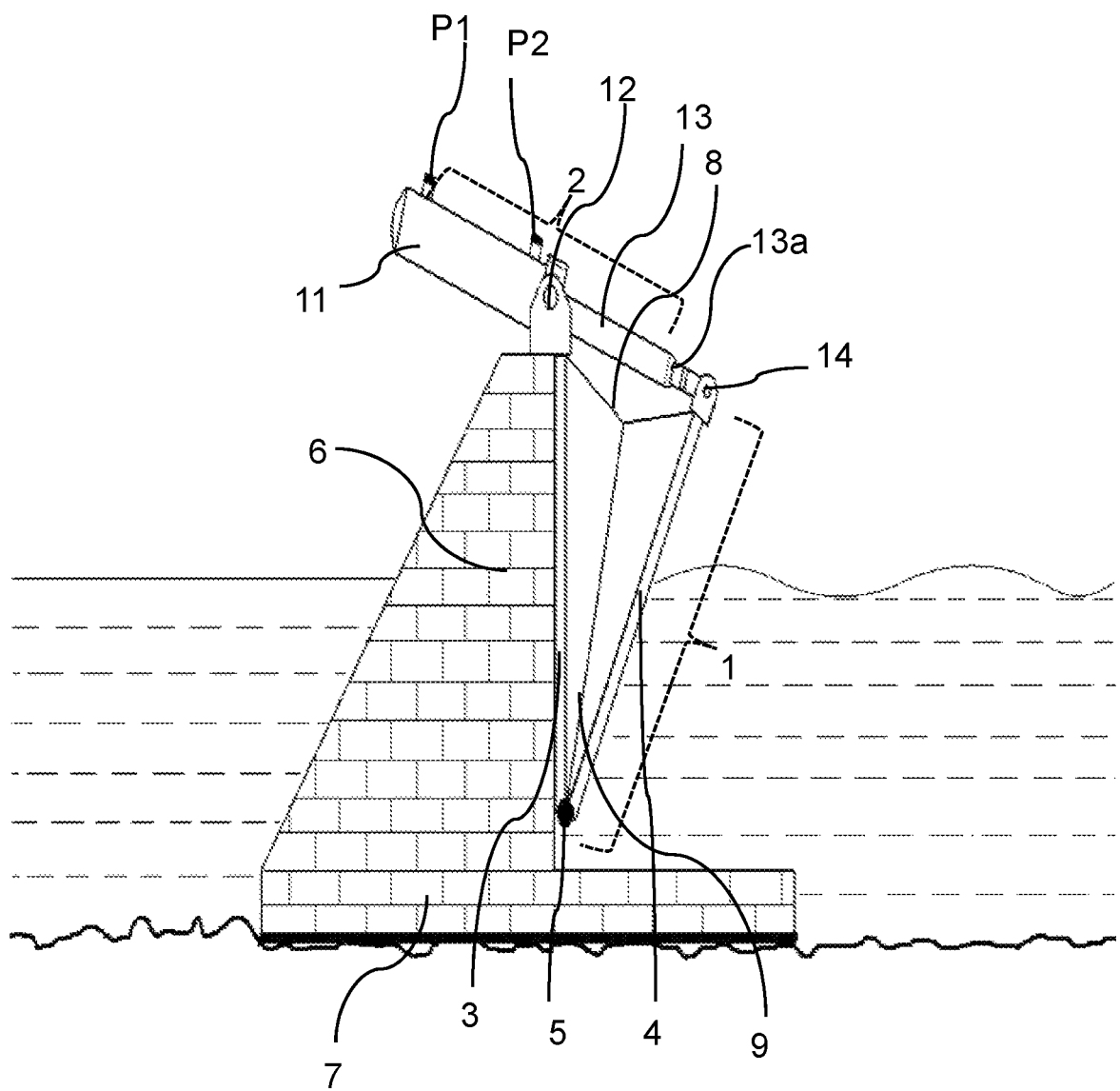
FIG. 1 shows an energy acquisition arrangement, according to an embodiment of the invention.

FIG. 1 shows an energy acquisition arrangement, according to an embodiment of the invention. The energy acquisition arrangement includes a first energy acquisition arrangement 1 and a second energy acquisition arrangement 2.

Figure 2A:
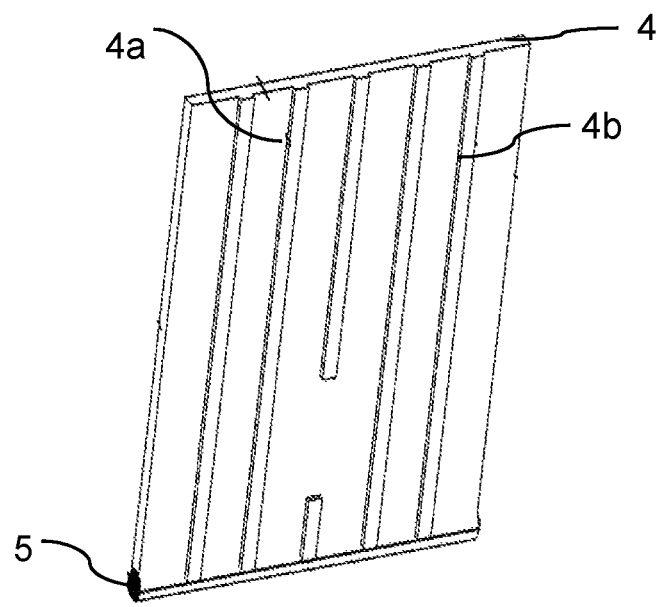
FIG. 2(a) shows a second partially resilient surface, according to an embodiment of the invention.
Figure 2B:
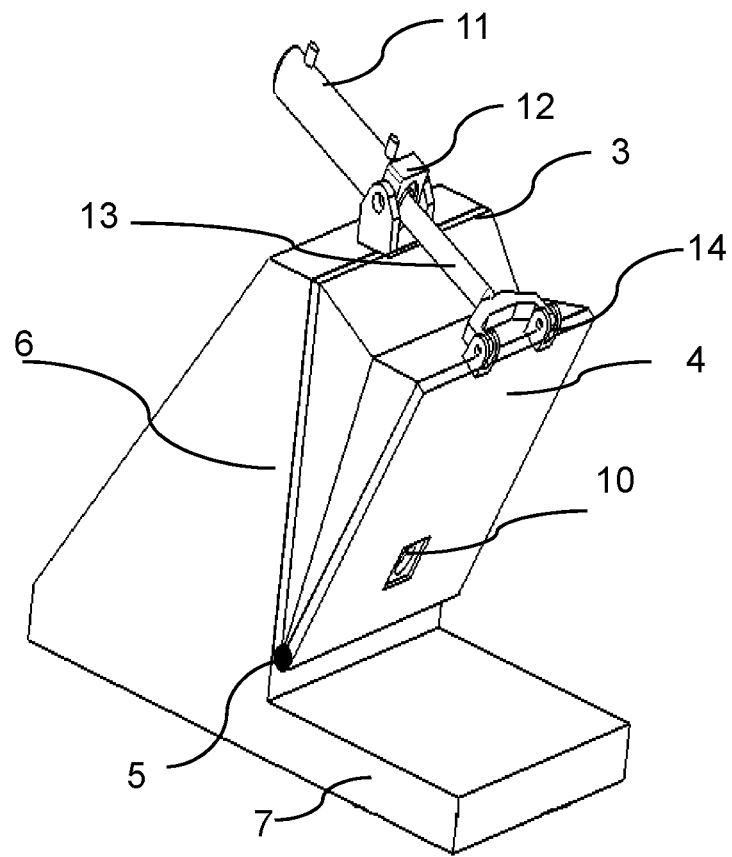
FIG. 2(b) shows an isometric view of the energy acquisition arrangement, according to an embodiment of the invention.

The first energy acquisition arrangement 1 includes a first partially resilient surface 3 and a second partially resilient surface 4 hinge mounted to the first partially resilient surface 3. In one example of the invention, the second partially resilient surface 4 is hinge mounted to the first partially resilient surface 3 at the bottom end by using a flexible leak proof hinge 5, which is made up of a material that includes a synthetic rubber, a rexine fabric and a nylon material. The first partially resilient surface 3 is mounted to the vertical surface 6 of the base 7. In one example, the first partially resilient surface 3 is fastened to the vertical support using fasteners. The second partially resilient surface 4 is constructed with several vertical main ribs 4a and supplementary ribs 4b that provide strength to the second partially resilient surface 4 as shown in FIG. 2(a). Further, the first partially resilient surface 3 and the second partially resilient surface 4 are connected by at least one third partially resilient surface 8 to create a space 9 for releasably holding a pre-determined volume of the water disposed of by an incoming wave. The pre-determined volume of water stored in the space 9 is dispensed from the space 9 to acquire a first energy. The first energy described herein is a potential energy. An auto water level control valve 10 is provided at the bottom of the second partially resilient surface 4, which helps in maintaining the water level in the space 9, as shown in FIG. 2(b).

The first partially resilient surface 3, the second partially resilient surface 4 and the third partially resilient surface 8 are made of a material that includes but are not limited to Steel, Galvanized iron, Aluminum alloys, Polyvinyl chloride (PVC), Acrylic [Poly methyl methacrylate (PMMA)], Aluminum composite materials (ACM), Carbon fibers, Fiber reinforced polymer composites (FRPC) and Synthetic rubber.

The second energy acquisition arrangement 2 is coupled to the first energy acquisition arrangement 1. The second energy acquisition arrangement is configured for acquiring energy from the first energy acquisition arrangement 1. The second energy acquisition arrangement 2 is also configured for acquiring a second energy. The second energy is acquired from the operation of the second energy acquisition arrangement 2. The second energy acquisition arrangement 2 described herein includes but is not limited to a rack pinion pulley, a hydraulic piston cylinder, a pneumatic turbine, a solenoid coil direct electrical drive and an electro-magnetic oscillating generator.

In one example of the invention, the second energy acquisition arrangement 2 is a hydraulic piston cylinder 11. The hydraulic piston cylinder 11 is coupled to the first energy acquisition arrangement 1 through a pivot bracket 12 at the top of the first partially resilient surface 3 so that the cylinder 11 can swing at the pivoted point. Further, the hydraulic piston cylinder 11 has a piston rod 13, wherein the eye end 13a of the piston rod 13 is connected to the second partially resilient surface 4 using a knuckle joint and an eye bolt 14, so that the piston rod 13 can swing with the oscillation of the second partially resilient surface 4. The cylinder 11 has two ports P1 and P2 through which pressurized hydraulic fluid passes from the cylinder 11 to an energy conversion arrangement.

Figure 3A:
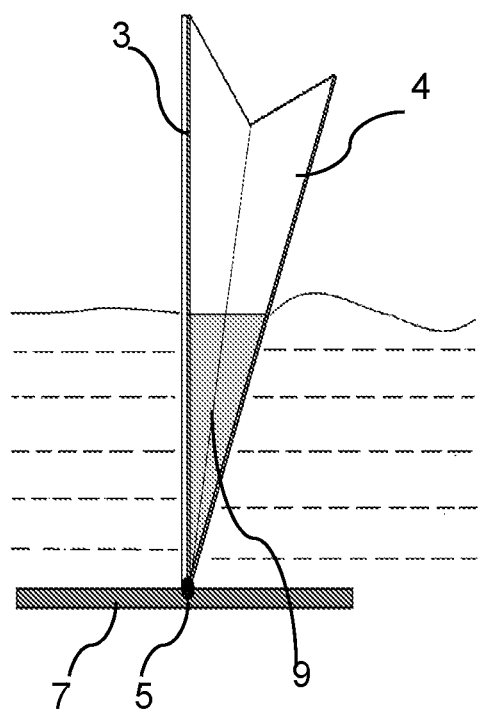
FIG. 3(a) shows the working principle of a first energy acquisition arrangement during a forward stroke, according to an embodiment of the invention.

FIG. 3(a) shows the working principle of a first energy acquisition arrangement during a forward stroke, according to an embodiment of the invention. During the forward stroke, the second partially resilient surface 4 is pushed towards the first partially resilient surface 3 by a wave. The movement of the second partially resilient surface 4 towards the first partially resilient surface 3 causes decreased volume inside the space 9. The level of water stored in the space 9 starts to rise with decrease in chamber volume. The total energy of the wave gets transformed and stored in the form of potential energy in the space 9. The height of water stored in the space 9 rises above the sea level and the height depends on the amount of energy possessed by the wave. Some amount of energy generated during the forward stroke is used to pump the pressurized hydraulic fluid into the energy conversion arrangement and the remaining energy is stored in the form of potential energy in the space 9. Alternatively, complete energy generated in the forward stroke can be retained for the energy conversion during a backward stroke.

Figure 3B:
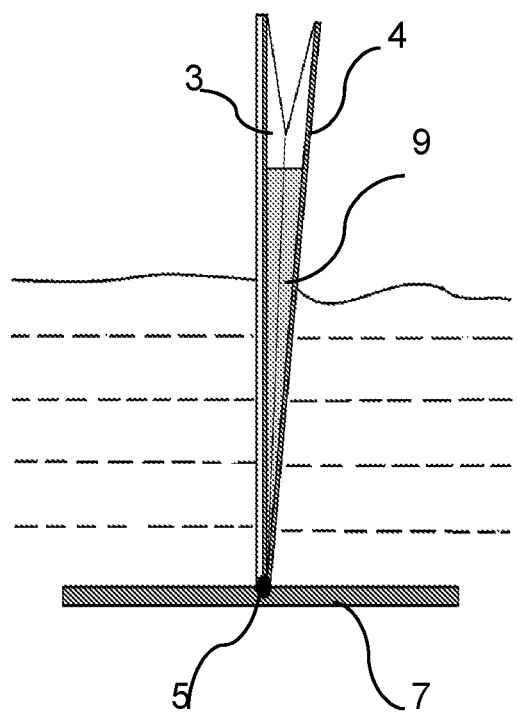
FIG. 3(b) shows the working principle of the first energy acquisition arrangement during a return stroke, according to an embodiment of the invention.

FIG. 3(b) shows the working principle of the first energy acquisition arrangement during a return stroke, according to an embodiment of the invention. During the return stroke, the wave striking on the second partially resilient surface 4 loses the kinetic energy by reaching a certain height over the second partially resilient surface 4. After reaching the certain height, the second partially resilient surface 4 starts to move in the direction opposite to the direction of the subsequent incoming wave and back to the initial position. The return movement of the second partially resilient surface 4 pulls the piston rod 13 of the cylinder 11. The movement of the piston rod 13 inside the cylinder 11 pumps the pressurized hydraulic fluid under high pressure through the port P2.

Figure 4:
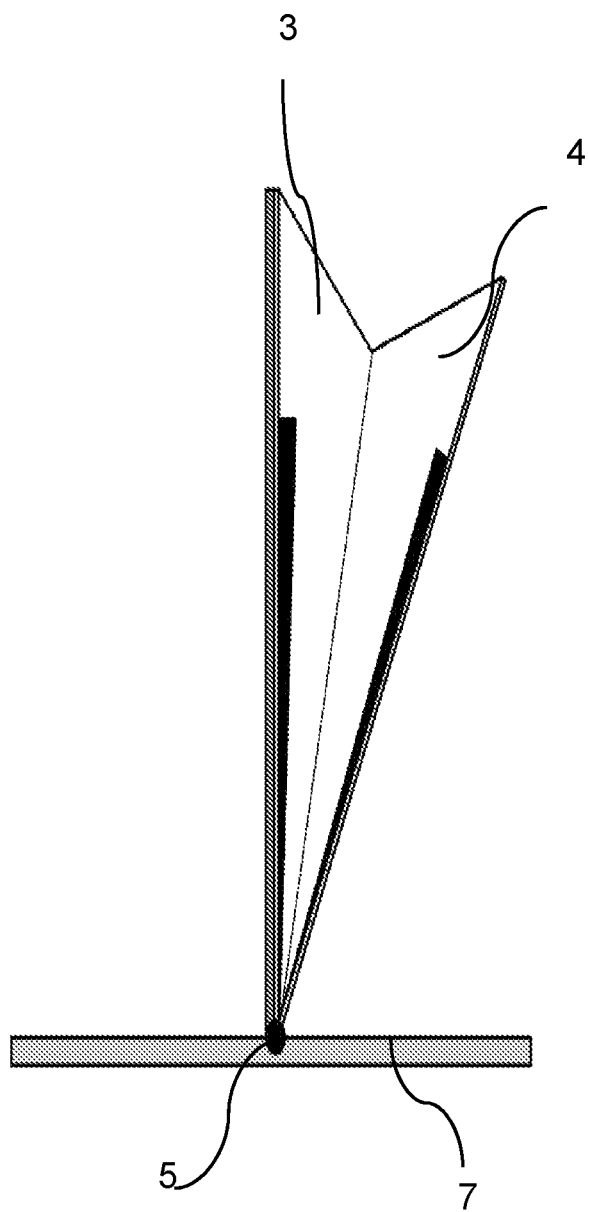
FIG. 4 shows a stopper arrangement inside the first energy acquisition arrangement, according to an embodiment of the invention.

FIG. 4 shows a stopper arrangement inside the first energy acquisition arrangement, according to an embodiment of the invention. The stopper arrangement is fastened to the first partially resilient surface 3 and the second partially resilient surface 4 using fasteners. The stopper arrangement is provided to prevent the damaging of both the first and the second energy acquisition arrangement (1 and 2), where the angle of oscillation exceeds the clearance angle of less than 5 degree between the resilient surfaces 3 and 4. The stoppers are made of damping materials that includes but are limited to synthetic rubber, Polyurethane and Polyvinyl chloride (PVC).

Figure 5:
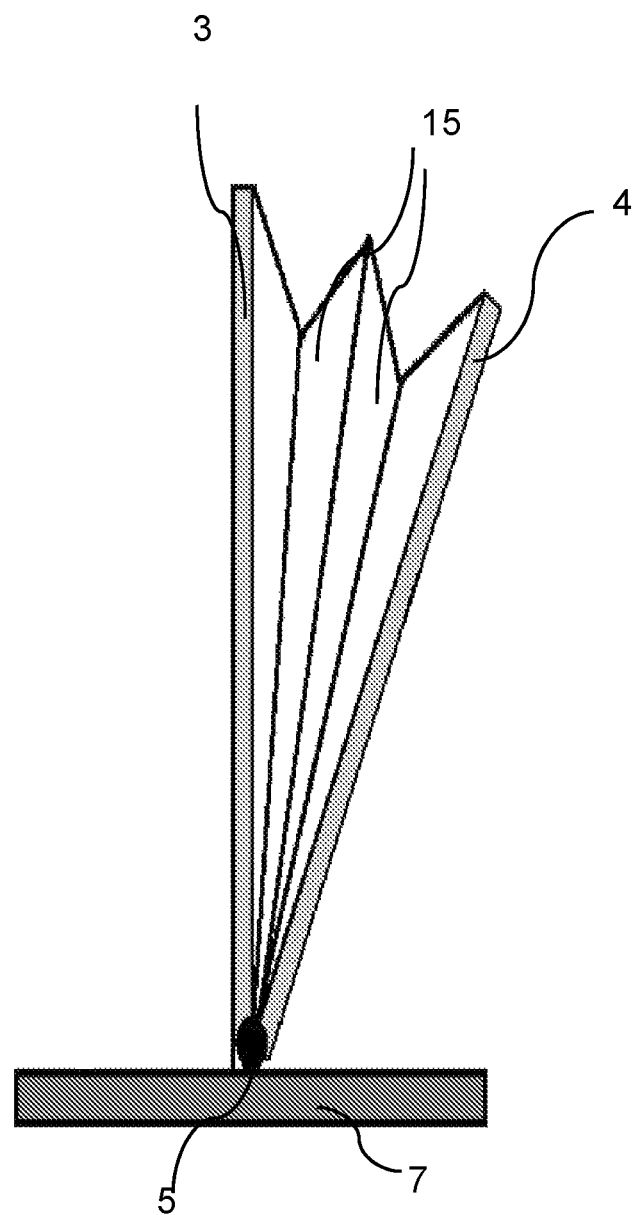
FIG. 5 shows the first energy acquisition arrangement, according to an alternate embodiment of the invention.

FIG. 5 shows the first energy acquisition arrangement, according to an alternate embodiment of the invention. The first energy acquisition arrangement 1 includes multiple sets of partially resilient surfaces 15. The multiple sets of partially resilient surfaces 15 are used as side wall at either side of the first partially resilient surface 3 and second partially resilient surface 4 instead on one set as shown in FIG. 1. The multiple sets of partially resilient surfaces 15 at the either sides are foldable with respect to the action of the second partially resilient surface 4.

Figure 6A:
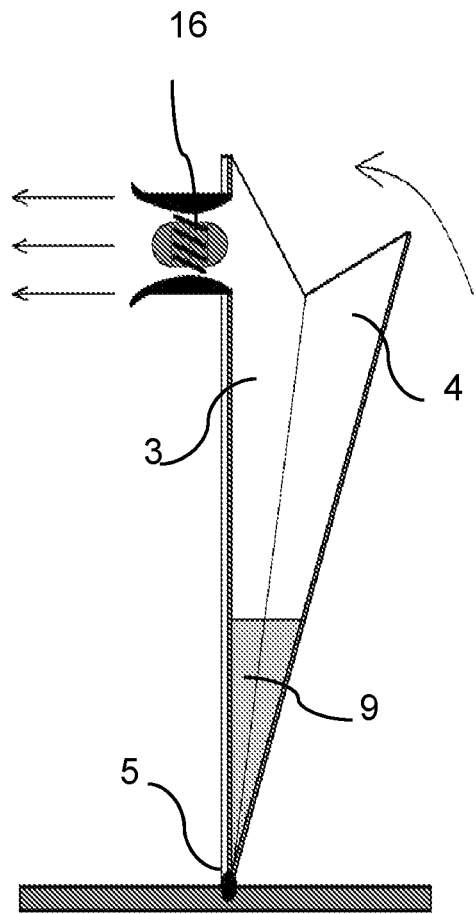
FIG. 6(a) shows a second energy acquisition arrangement during a forward stroke, according to an alternate embodiment of the invention.

FIG. 6(a) shows a second energy acquisition arrangement during a forward stroke, according to an alternate embodiment of the invention. The second energy acquisition arrangement 2 includes a bi-directional pneumatic turbine 16 which is connected at the top behind the first partially resilient surface 3. Initially, the turbine is at rest position and the water level in the space 9 is equal to the level of sea water. During the forward stroke, the second partially resilient surface 4 moves towards the first partially resilient surface 3 and results in decreasing of volume of the space 9. The movement of the second partially resilient surface 4 towards the first partially resilient surface 3, pushes the air through the bi-directional turbine 16.

Figure 6B:
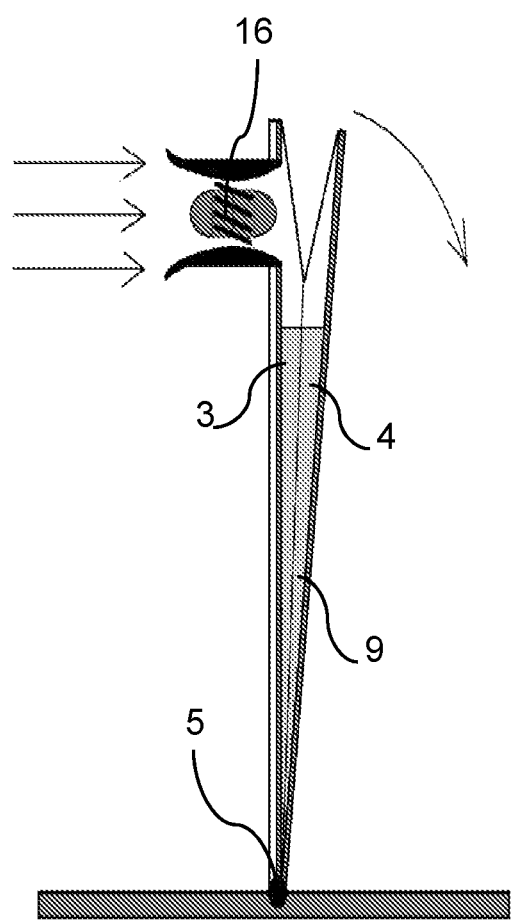
FIG. 6(b) shows the second energy acquisition arrangement during a return stroke, according to an alternate embodiment of the invention.

FIG. 6(b) shows the second energy acquisition arrangement during return stroke, according to an alternate embodiment of the invention. During the return stroke, the second partially resilient surface 4 moves towards the original position and results in increasing of volume of the space 9. The movement of the second partially resilient surface 4 towards the original position sucks the air through the bi-directional turbine 16. The bi-directional flow of air through the turbine 16 spins the turbine 16 only in one direction and drives a generator (not shown) to generate electricity.

Figure 7:
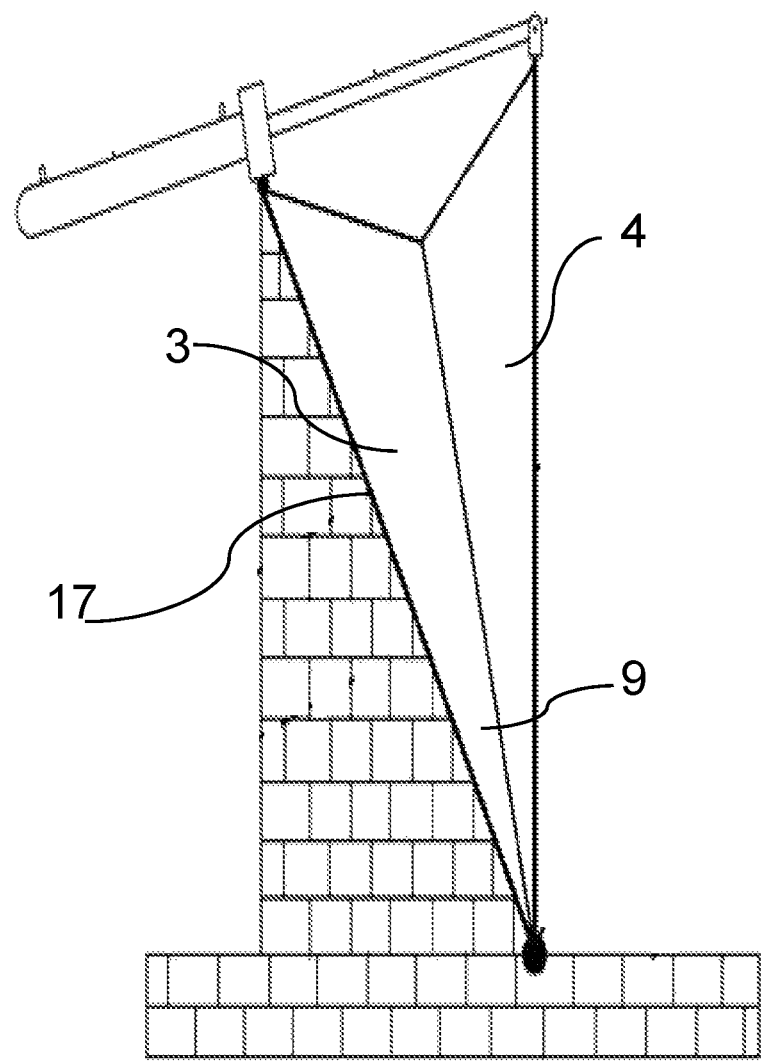
FIG. 7 shows an inclined arrangement of the first partially resilient surface, according to an alternate embodiment of the invention.

FIG. 7 shows an inclined arrangement of the first partially resilient surface, according to an alternate embodiment of the invention. The inclined supporting structure 17 supports the first partially resilient surface 3 and the second partially resilient surface 4 in vertical position. The angle of inclination of the first partially resilient surface 3 with the vertically placed second partially resilient surface 4 creates the space 9 for releasably holding the pre-determined volume of the water disposed of by the incoming sea wave. During striking of the wave over the second partially resilient surface 4, the second partially resilient surface 4 moves towards the inclined first partially resilient surface 3. The volume inside the space 9 decreases with the increase of water level above the sea level. The increase of water level pushes the second partially resilient surface 4 backward to the home position. The back and forth movement of the second partially resilient surface 4 is used to drive an energy conversion arrangement (not shown) for generating the electrical energy.

Figure 8:
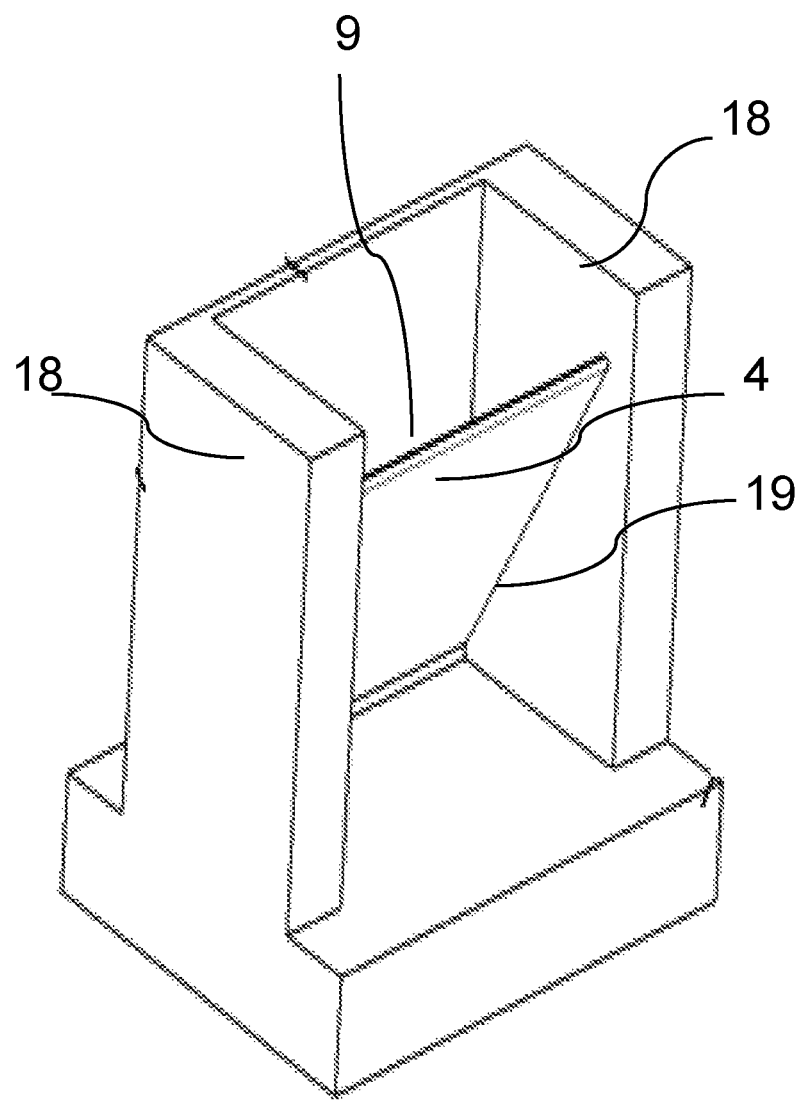
FIG. 8 shows a solid side wall for the vertical surface, according to yet another embodiment of the invention.

FIG. 8 shows a solid side wall for the vertical surface, according to yet another embodiment of the invention. A solid side wall 18 is constructed at either sides of the vertical surface 6. The side edges of the second partially resilient surface 4 slides over the surface of the solid side walls 18. A sealing gasket 19 is provided between the second partially resilient surface 4 and the solid side wall 18. The sealing gasket 19 prevents the leakage of water from the space 9.

Figure 9:
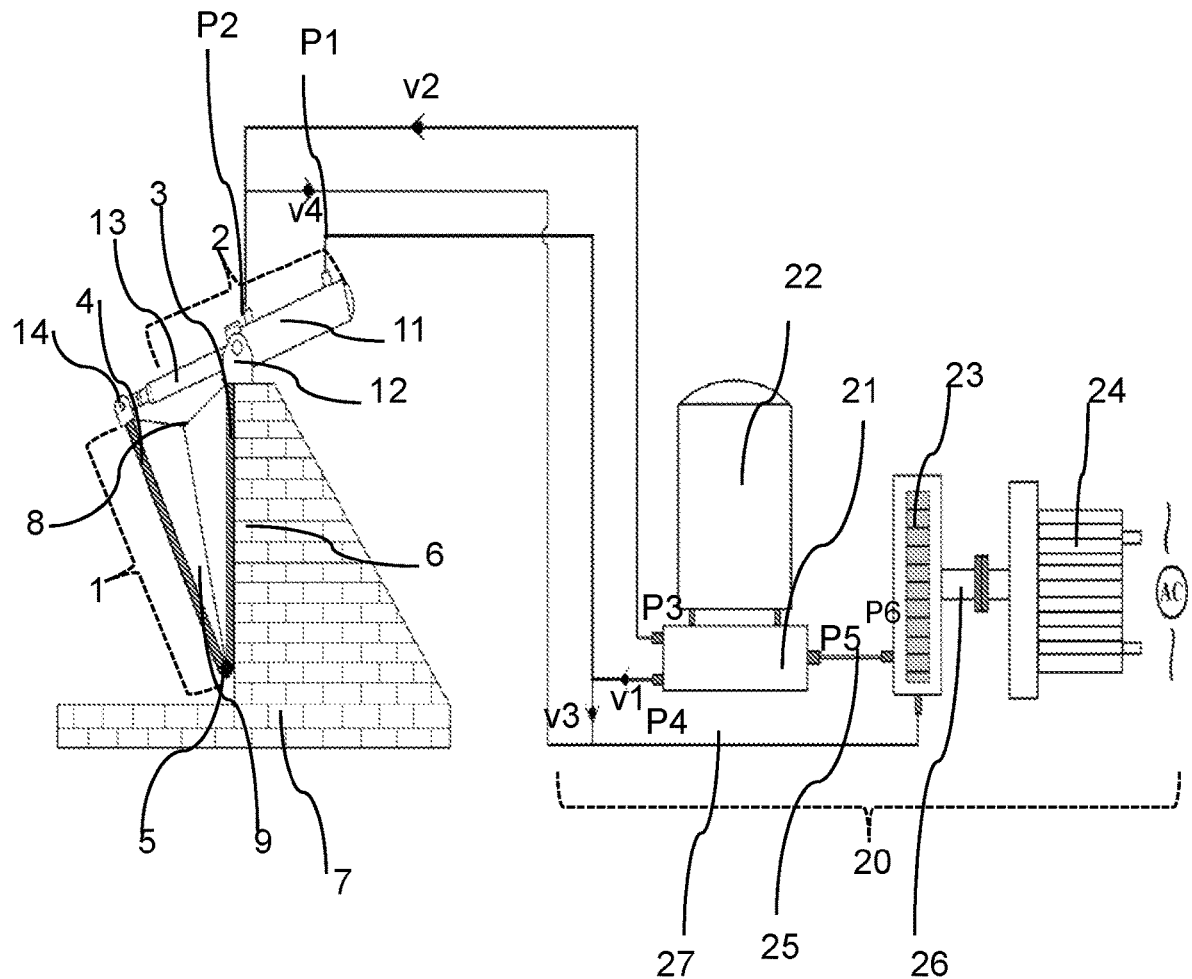
FIG. 9 shows a bi stage wave energy converter, according to an embodiment of the invention.

FIG. 9 shows a bi stage wave energy converter, according to an embodiment of the invention. The energy converter includes a first energy acquisition arrangement 1, a second energy acquisition arrangement 2 coupled to the first energy acquisition arrangement 1. The first energy acquisition arrangement 1 includes a first partially resilient surface 3 and a second partially resilient surface hinge 4 mounted to the first partially resilient surface 3. In one example of the invention, the second partially resilient surface 4 is hinge mounted to the first partially resilient surface 3 at the bottom end by using a flexible leak proof hinge 5. The first partially resilient surface 3 is mounted to a vertical surface 6 of a base 7. The first partially resilient surface 3 and the second partially resilient surface 4 are connected by at least one third partially resilient surface 8 to create a space 9 for releasably holding a pre-determined volume of the water disposed of by an incoming wave. The pre-determined volume of water stored in the space 9 is dispensed from the space to acquire a first energy. The first energy described herein is a potential energy. An auto water level control valve 10 (not shown) is provided at the bottom of the second partially resilient surface 4 which helps in maintaining the water level in the space 9. The second energy acquisition arrangement 2 is configured for acquiring energy from the first energy acquisition arrangement 1. The second energy acquisition arrangement 2 is also configured for acquiring a second energy. The second energy is acquired from the operation of the second energy acquisition arrangement 2. The second energy acquisition arrangement 2 described herein includes but is not limited to a rack pinion pulley, a hydraulic piston cylinder, a pneumatic turbine, a solenoid coil direct electrical drive and an electro-magnetic oscillating generator.

In one example of the invention, the second energy acquisition arrangement 2 is a hydraulic piston cylinder 11. The hydraulic piston cylinder 11 is coupled to the first energy acquisition arrangement 1 through a pivot bracket 12 at the top of the first partially resilient surface 3 so that the cylinder 11 can swing at the pivoted point. Further, the hydraulic piston cylinder 11 has a piston rod 13, wherein the eye end of the piston rod 13 is connected to the second partially resilient surface 4 using a knuckle joint and an eye bolt 14, so that the piston rod 13 can swing with the oscillation of the second partially resilient surface 4. The cylinder 11 has two ports P1 and P2 through which pressurized hydraulic fluid passes from the cylinder 11 to an energy conversion arrangement 20. The energy conversion arrangement 20 is coupled to the first energy acquisition arrangement 1 and the second energy acquisition arrangement 2. The energy conversion arrangement 20 includes a pressure control unit 21. The pressure control unit 21 is connected to the ports (P1 and P2) of the cylinder 11 through the ports (P3 & P4) for controlling the movement of the second partially resilient surface 4 based on the hydraulic fluid pressure. In one embodiment of the invention, the port P1 is connected to the inlet port P4 of the pressure control unit 21 through a non-return valve V1 and the port P2 is connected to the inlet port P3 of the pressure control unit 21 through a non-return valve V2. An accumulator 22 is connected to the pressure control unit 21 to store the pressurized hydraulic fluid for continuous supply of the pressurized hydraulic fluid. A hydraulic motor 23 is connected to the pressure control unit 21 for generating a mechanical energy from the pressurized hydraulic fluid. A generator 24 is coupled to the hydraulic motor 23 for generating an electrical energy from the mechanical energy. During the forward stroke, the second partially resilient surface 4 is pushed towards the first partially resilient surface 3 by the wave. The second partially resilient surface 4 pushes a piston (not shown) of the hydraulic piston cylinder 11 through the piston rod 13. The movement of the piston inside the hydraulic piston cylinder 11 pumps the hydraulic fluid under high pressure through the port P1. When the pressure rises inside the piston front side area of the cylinder 11, the non-return valve V1 opens and allows the hydraulic fluid to flow into the pressure control unit 21. The pressure control unit 21 regulates the hydraulic fluid pressure inside the energy conversion arrangement 20 and supplies the pressurized hydraulic fluid to the accumulator 22 to store the hydraulic fluid under pressure. An outlet port P5 of the pressure control unit 21 is connected to an inlet port P6 of the hydraulic motor 23 by a high-pressure pipe 25. The pressurized hydraulic fluid stored in the accumulator 22 is supplied to the hydraulic motor 23 which drives the hydraulic motor 23. The hydraulic motor 23 converts the pressure of the hydraulic fluid into rotary motion and drives the drive shaft 26. The drive shaft 26 is connected to the generator 24. The generator 24 generates the electricity from the rotary motion. After the energy conversion, the hydraulic fluid in the hydraulic motor 23 loses the high pressure and is delivered to the return line 27 as low-pressure hydraulic fluid. Simultaneously, the piston inside the cylinder 11 sucks the low-pressure hydraulic fluid into the piston rear side space of the cylinder through a non-return valve V4. The remaining two non-return valves V2 and V3 are always closed. The function of the non-return valve is to allow the flow in one direction. During the return stroke, the second partially resilient surface 4 moves back to the original position. The backward movement of second partially resilient surface 4 pulls the piston of the cylinder 11 through piston rod 13. The movement inside the cylinder 11 pumps the hydraulic fluid under high pressure through the port P2. When the pressure rises inside the piston rear side space of the cylinder, the non-return valve V2 opens and allows the working fluid to flow into the pressure control unit 21 through the port P3. The pressure control unit 21 regulates the working fluid pressure inside the energy conversion arrangement 20 and supplies the pressurized hydraulic fluid to the accumulator 22 to store the hydraulic fluid under pressure. An outlet port P5 of the pressure control unit 21 is connected to an inlet port P6 of the hydraulic motor 23 by a high-pressure pipe 25. The pressurized hydraulic fluid stored in the accumulator 22 is supplied to the hydraulic motor 23 which drives the hydraulic motor 23. The hydraulic motor 23 converts the pressure of the hydraulic fluid into rotary motion and drives the drive shaft 26. The drive shaft 26 is connected to the generator 24. The generator 24 generates the electricity from the rotary motion. After the energy conversion, the hydraulic fluid in the hydraulic motor 23 loses the high pressure and is delivered to the return line 27 as low-pressure hydraulic fluid. Simultaneously, the piston inside the cylinder 11 sucks the low-pressure hydraulic fluid into the piston front side space of the cylinder through a non-return valve V3. The remaining two non-return valves V1&V4 are always closed and process continues as explained in the forward stroke.

Thus, the invention provides a bi-stage wave energy converter. The energy acquisition arrangements in the bi-stage wave energy converter prevent the energy loss back into the ocean, thereby increasing the efficiency of the energy conversion. The converter is configured for operation both on high tide and low tide conditions. Further, the converter is configured to convert energy both during an advancing wave and a receding wave. The foregoing description of the invention has been set for merely to illustrate the invention and is not intended to be limiting. Since modifications of the disclosed embodiments incorporating the scope and substance of the invention may occur to person skilled in the art, the invention should be construed to include everything within the scope of the appended claims and equivalents thereof.

We claim:

1. A bi stage wave energy converter, the converter comprising:
    a base having a vertical surface, a first energy acquisition arrangement, a second energy acquisition arrangement, and, an energy conversion arrangement,
    the first energy acquisition arrangement, having:
        a first flap mounted to the vertical surface of the base;
        a second flap hingedly mounted to the first flap through a hinge;
        at least one third partially resilient surface comprising foldable flank;
        wherein the first flap and the second flap are connected by the at least one third partially resilient surface to create a space between the first flap, the second flap and the at least one third partially resilient surface for releasably holding a pre-determined volume of water disposed of by an incoming wave;
    the second energy acquisition arrangement being coupled to the second flap of the first energy acquisition arrangement, and movement of the second flap of the first energy acquisition arrangement moves the second energy acquisition arrangement, such that the second energy acquisition arrangement acquires energy from the first energy acquisition arrangement; and
    the energy conversion arrangement being coupled to the first energy acquisition arrangement and to the second energy acquisition arrangement, and, the energy conversion arrangement being configured for converting the energy acquired by the first energy acquisition arrangement and by the second energy acquisition arrangement.

2. The wave energy converter as claimed in claim 1, wherein the first flap, the second flap and the third partially resilient surface are selected from a list comprising of Steel, Galvanized iron, Aluminum alloys, Polyvinyl chloride (PVC), Acrylic (Poly methyl methacrylate (PMMA)), Aluminum composite materials (ACM), Carbon fibers, Fiber reinforced polymer composites (FRPC) and Synthetic rubber.

3. The wave energy converter as claimed in claim 1, wherein the second energy acquisition arrangement is selected from a list comprising of rack pinion pulley, hydraulic piston cylinder, pneumatic turbine, solenoid coil direct electrical drive and electro-magnetic oscillating generator.

4. The wave energy converter as claimed in claim 1, wherein
    the pre-determined volume of water held in the space is such that a water level inside the space is equal to a mean sea level in a neutral position of the wave energy converter, and
    when the wave energy converter is actuated by waves, the second flap being pressed by the waves, the second flap rotates about the hinge with respect to the first flap, and, the water level inside the space rises above the mean sea level and an energy extracted from the waves is stored as a potential energy, being a first energy acquired by the wave energy converter.

5. The wave energy converter as claimed in claim 1, wherein the first energy is a potential energy.

6. The wave energy converter as claimed in claim 1, wherein the second energy acquisition arrangement is configured for acquiring a second energy.

7. The wave energy converter as claimed in claim 1, wherein the second energy is acquired from the operation of the second energy acquisition arrangement by the movement of the second flap of the first energy acquisition arrangement that moves the second energy acquisition arrangement.

8. The wave energy converter as claimed in claim 1, wherein the wave energy converter is configured for operation both on high tide and on low tide conditions.

9. The wave energy converter as claimed in claim 1, wherein the converter is configured to convert energy both during an advancing wave and during a receding wave.

* * * * *